United States Patent [19]
Parish et al.

[11] Patent Number: 5,222,216
[45] Date of Patent: Jun. 22, 1993

[54] HIGH PERFORMANCE COMMUNICATIONS INTERFACE FOR MULTIPLEXING A PLURALITY OF COMPUTERS TO A HIGH PERFORMANCE POINT TO POINT COMMUNICATIONS BUS

[75] Inventors: Edward C. Parish, Brookline; Robert A. Doolittle, Acton; Sharon E. Gillett, Watertown; Thomas J. Moser, Somerville, all of Mass.; William A. Nesheim, Windham, N.H.; David L. Satterfield, Everett; James P. Tardiff, Framingham, both of Mass.

[73] Assignee: Thinking Machines Corporation, Cambridge, Mass.

[21] Appl. No.: 729,429

[22] Filed: Jul. 12, 1991

[51] Int. Cl.⁵ .............................................. G06F 13/00
[52] U.S. Cl. ................................... 395/275; 395/200; 395/550
[58] Field of Search ................... 364/DIG. 1, DIG. 2; 395/275, 325, 800, 550

[56] References Cited

U.S. PATENT DOCUMENTS

| | | | |
|---|---|---|---|
| 3,820,079 | 6/1974 | Bergh et al. | 395/325 |
| 4,319,323 | 3/1982 | Ermolovich et al. | 364/200 |
| 4,490,784 | 12/1984 | Ives et al. | 364/200 |
| 4,821,180 | 4/1989 | Gerety et al. | 395/275 |
| 4,827,409 | 5/1989 | Dickson | 364/200 |
| 4,860,244 | 8/1989 | Bruckert et al. | 364/900 |
| 5,003,463 | 3/1991 | Coyle et al. | 395/275 |

OTHER PUBLICATIONS

*CM-HIPPI User's Guide,* Version 6.0, issued by Thinking Machines Corporation, 245 First Street, Cambridge, Mass. 02142-1264, pp. i-viii and 1-55, Dec. 1990.

High-Performance Parallel Interface–Mechanical, Electrical, and Signalling Protocol Specification, (preliminary draft proposed American National Standard for information systems), X3T9/88-127, X3T9.3/88-023, Rev 8.0, pp. i-vi and 1-44, Jan. 22, 1991.

Press Release entitled "Pittsburgh Center Achieves High-Speed Supercomputing Link," from Thinking Machines Corporation, 256 First St., Cambridge, Mass. 02142-1264, consisting of 4 pages, Feb. 19, 1991.

*Primary Examiner*—Robert L. Richardson
*Attorney, Agent, or Firm*—Weingarten, Schurgin, Gagnebin & Hayes

[57] ABSTRACT

A high performance communications interface device for connecting a high speed computer to a high performance communications bus. The high performance communications interface device includes a high performance communications interface device processor, a source interface, a destination interface and at least one I/O processor which controls the transfer of data to the high speed computer from the high performance communications bus and from the high speed computer to the high performance communications bus.

17 Claims, 14 Drawing Sheets

HIGH PERFORMANCE COMMUNICATIONS INTERFACE FOR MULTIPLEXING A PLURALITY OF COMPUTERS TO A HIGH PERFORMANCE POINT TO POINT COMMUNICATIONS BUS

FIELD OF THE INVENTION

The invention relates to the field of computer to computer communication devices.

BACKGROUND OF THE INVENTION

In an effort to increase the functionality of computers, users have created communication networks interconnecting computers via overwirings through appropriate interfaces. These networks permit a user on one computer to exchange data with and to execute programs on other computers. The ability to execute a program on a second computer connected on the network permits a program to be partitioned among computers so as to speed the computation of the program. In many instances a program is partitioned to make use of special hardware on another computer to further speed the computations. An example of this is a computer having special vector processing hardware. A computer without such vector processing hardware transfers vector data to the computer with the vector processing hardware, which then performs the vector calculations using the special hardware and returns the results to the computer without the vector processing hardware.

Such a transfer of data over a network results in increased speed of computation only if the amount of time required for data transfer over the network is less than the amount of time required to make the computations once the data have been transferred. The network must be able to transfer large amounts of data quickly and reliably. The advent of the supercomputer has increased the rate at which data must be transferred over the network, including interfaces, in order to justify such transfers in light of the speed at which this type of computer processes data once it is available.

Although supercomputers execute instructions quickly, the various architectures of the supercomputers make each design more appropriate for some computations than for others. For example, massively parallel processors are more useful for executing programs which contain repetitive instructions, such as loops, while vector supercomputers are more useful in executing vector instructions. Since a single calculation may have both repetitive instructions, such as loops, and vector instructions, a significant increase in speed may be obtained by partitioning a program across several supercomputers and permitting them to transfer data among themselves by way of a high speed network.

A standard for interfaces for one such high speed communication network for use with supercomputers has been proposed in the X3T9 American National Standard for Information systems (ANSI) specification and is termed the HIgh performance Parallel Interface (HIPPI). This interface standard permits point-to-point communication between two supercomputers at speeds of up to 1600 Mbits/sec. However, because of this high bandwidth, the communications link may be under-utilized due to interface bottlenecks causing periods during which no data can be transferred. These periods typically occur during the time the data, which have been previously transferred, are being used in computations or passed through the interface.

The present invention relates to a device to multiplex several supercomputers onto the same point to point communication network to more fully utilize the communication link.

SUMMARY OF THE INVENTION

The invention disclosed herein relates to a high performance communications interface device for connecting a high speed supercomputer to high performance communication buses. The high performance communications interface device, which controls the transfer of data to the supercomputer from a first high performance communication bus and from the supercomputer to a second high performance communication bus, includes a high performance communication interface device processor, a source interface, a destination interface and at least one I/O processor.

The I/O processor transfers data from a computer communication bus connected to the supercomputer to a first data bus connected to the source interface. The source interface then transfers data from the first data bus to the second high performance communication bus. Conversely, the destination interface transfers data from the first high performance communication bus to a second data bus. The I/O processor then transfers the data from the second data bus to the computer communication bus where it is transferred to the computer.

The source and destination interfaces and the I/O processor are controlled by the high performance communication interface device processor. The high performance communication interface device processor issues commands to the other modules of the high performance communication interface by way of a high performance communication interface device bus. The instructions are issued by the high performance communication interface device processor in response to commands issued to the high performance communication interface device by the computer.

The source and destination interfaces are event driven and queue events, such as the reception of data from the high performance bus, in an event FIFO. A state machine removes events from the queue and executes instructions in response to the events which are dequeued.

BRIEF DESCRIPTION OF THE DRAWING

These and other features and advantages of the invention will be more readily understood in view of the accompanying specification and drawings in which.

DESCRIPTION OF THE PREFERRED EMBODIMENT

Figure 1:
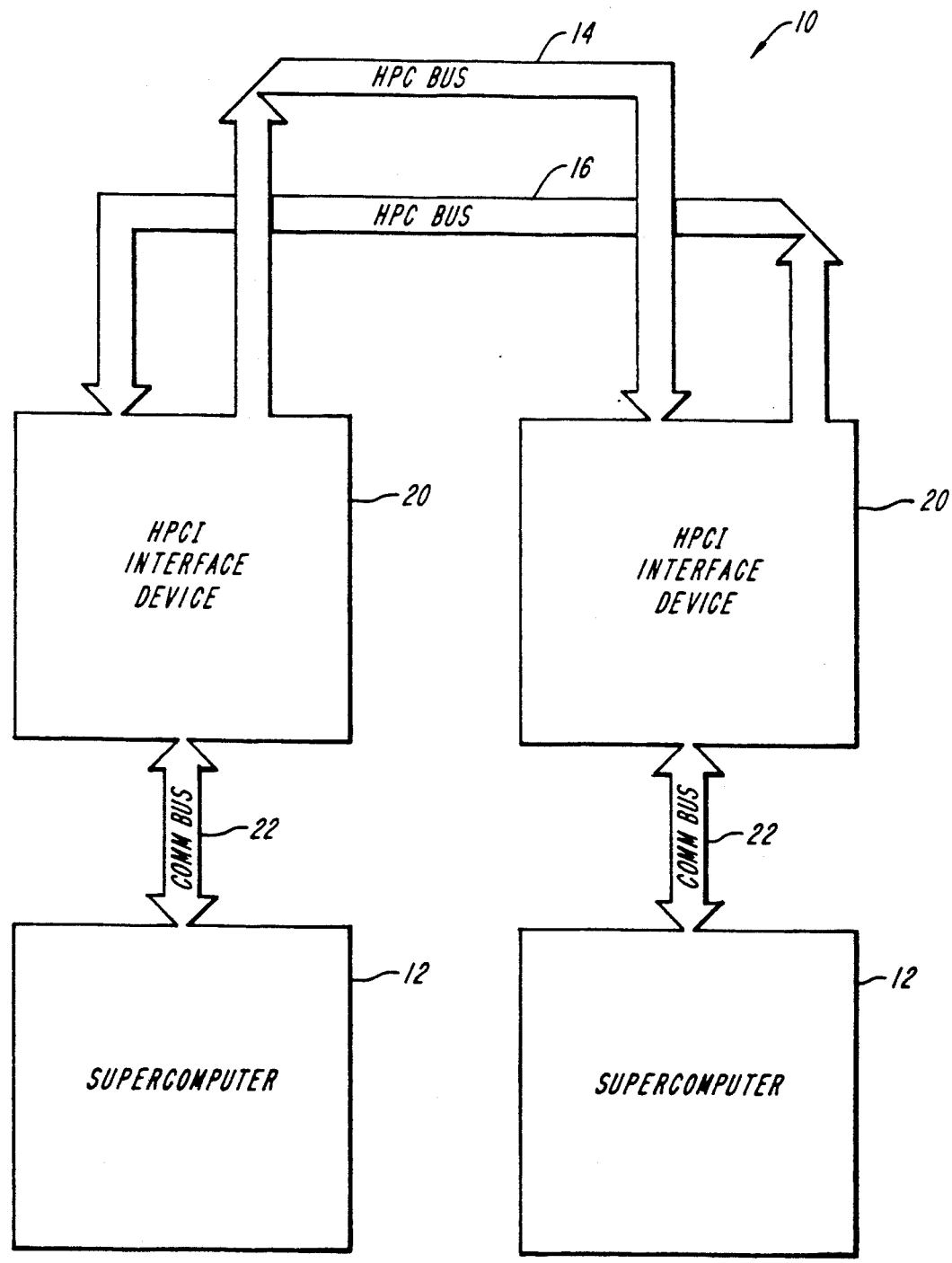
FIG. 1 is a block diagram of an embodiment of a high performance communication system utilizing an embodiment of the high performance communication interface device of the invention.

In brief overview and referring to FIG. 1, an embodiment of a communication system 10 permitting communication between two high speed supercomputers 12 connected by two point-to-point uni directional high performance communication (HPC) buses 14,16 includes a pair of high performance communication interface (HPCI) devices 20 each respectively connected to one of the supercomputers 12 by a computer communications bus 22. In one embodiment, such as described in the proposed ANSI X3T9 HIgh performance parallel Interface (HIPPI) standard, each point-to-point unidirectional high performance communication (HpC) bus 14,16 is a 25 meter maximum length cable having fifty twisted wire pairs. Thirty two of the twisted wire pairs are used for data, four of the twisted wire pairs are used for parity, seven of the twisted wire pairs are control lines, and the remainder are ground connections and wire pairs reserved for future use. In another embodiment of the ANSI X3T9 standard, two cables of fifty twisted wire pairs are used to provide sixty four data lines, eight parity lines, and eight control lines with the remainder being ground connections and pairs reserved for future use.

In the X3T9 embodiment discussed above, data to be transferred over the HPC buses 14,16 are arranged in a framing hierarchy. The smallest unit of data transmission is termed a burst and contains from one to 256 words; each of which are 32 or 64 bits long. Appended to each burst is a redundancy checkword. During transmission, between the redundancy check word of one burst and the start of the next burst, there is a period of time, termed a wait time, during which data on the bus are indeterminant. Groups of one or more bursts transmitted sequentially constitute a packet. Packets also may be separated from adjacent packets by a wait time and one or more packets may be transmitted during any one session, or connection, between HPCI devices.

A session, or connection, is established between HPCI devices by the assertion of a signal on a control line (REQUEST) by the requesting, or source HPCI device and the assertion of a signal on a control line (CONNECT) by the receiving, or destination HPCI device. Following the assertion of a control line (CONNECT) by the destination HPCI device, the destination HPCI device asserts a signal on a control line (READY) each time the destination HPCI is ready to accept one burst of data. Preceeding each burst of data transmitted, the source HPCI device asserts a signal on a control line (BURST). Similarly preceeding each packet of data transmitted, the source HPCI device asserts a signal on another control line (PACKET). (BURST) and (PACKET) are deasserted after each burst and packet, respectively, thereby delimiting the burst and the packet. While the use of the described control lines in this manner provides the handshaking required for reliable communications at the physical layer of the network, other protocols and control lines may used to perform the same function.

Figure 2:
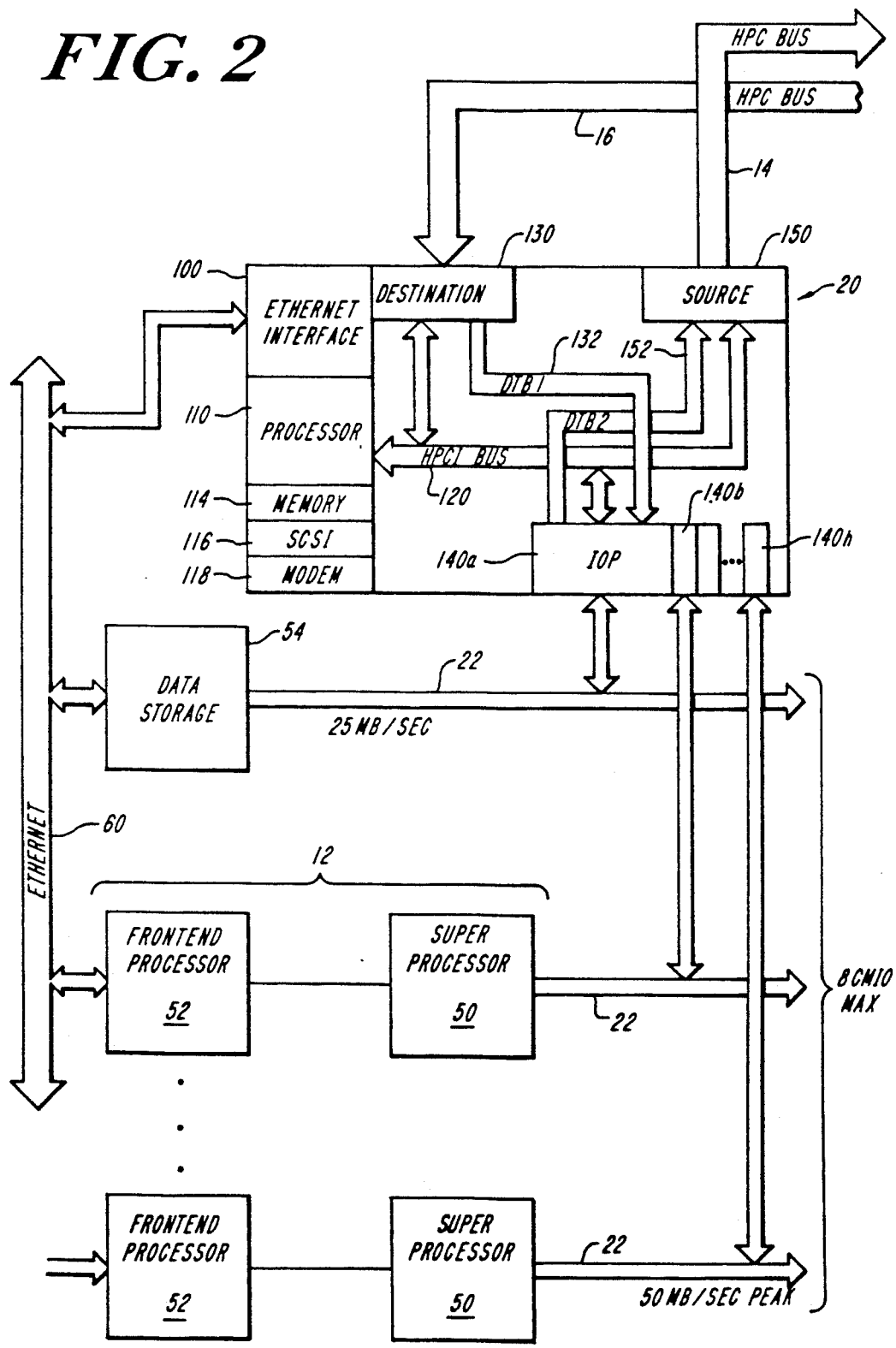
FIG. 2 is a block diagram of an embodiment of the high performance communication interface device constructed in accordance with the invention and the interconnection of that embodiment with computers and data storage devices in the high performance communication system as shown in FIG. 1.
Figure 3:
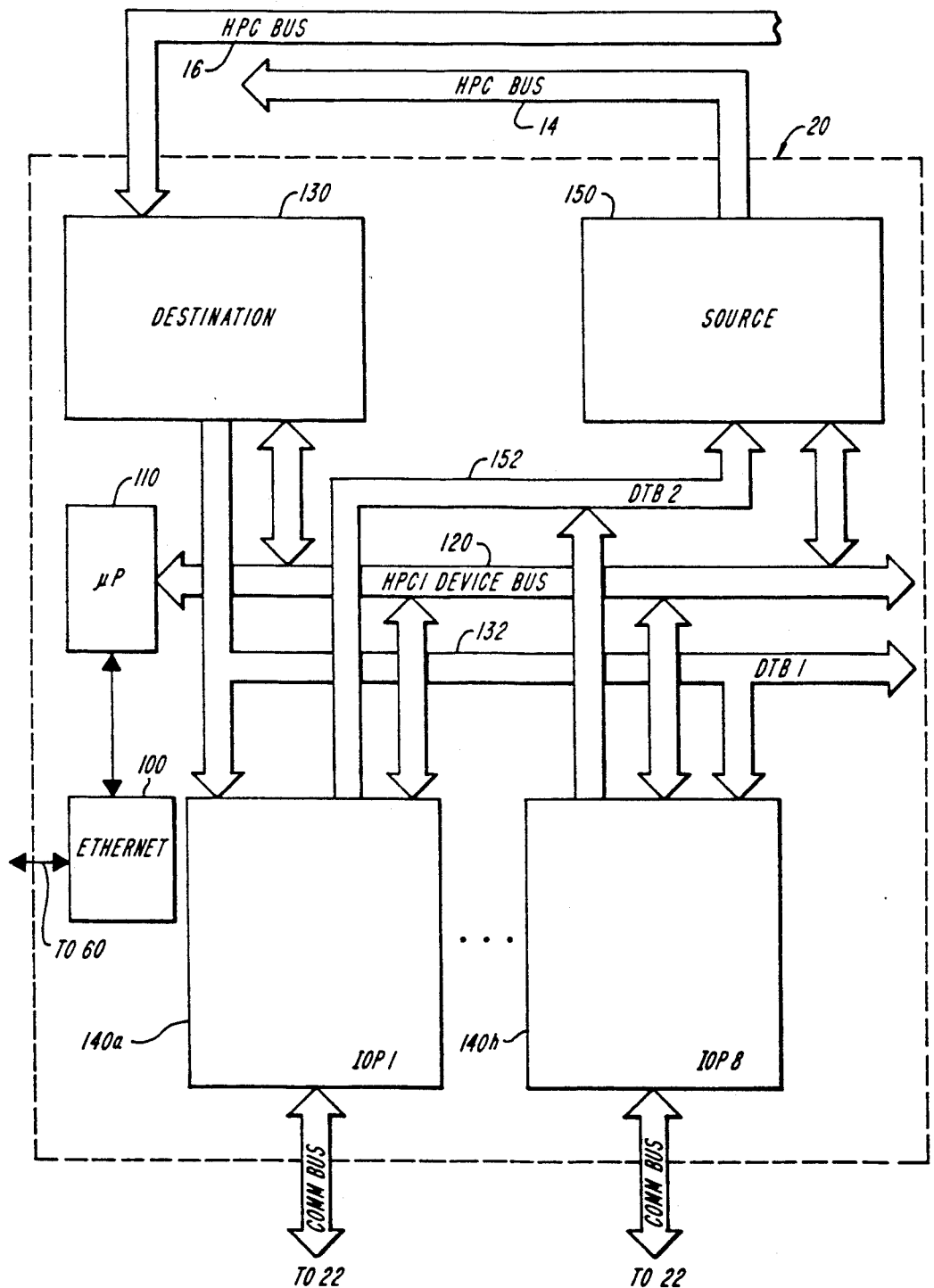
FIG. 3 is a block diagram of an embodiment of the high performance communication interface device of the invention shown in FIG. 2.

Referring to FIGS. 2 and 3, an embodiment of the high performance communication interface (HPCI) device 20 is shown in communication with the high performance communication (HPC) buses 14,16 and a series of supercomputers 12 and data storage devices 54. Each supercomputer has a frontend processor 52 and a superprocessor 50. Data are transferred at a maximum peak rate of 400 Mbits/sec between the high performance communication interface (HPCI) device 20 and the superprocessor 50 of the supercomputer 12 by way of computer communication buses 22. Data transfer to each data storage device 54 occurs at a maximum of 32 Mbits/sec. Instructions pass to the high performance communication interface (HPCI) device 20 and the data storage device 54 from the frontend processor 52 by way of a separate communication link 60. In the embodiment herein disclosed this link is an Ethernet network, but other communication links may be used.

The high performance communication interface (HPCI) 20 of the embodiment shown, includes an ethernet interface 100 which receives commands from the frontend processors 52 and which passes those commands to the high performance communication interface (HPCI) device processor 110. The HPCI device processor 110 also has associated with it a local memory 114; a disk interface 116; and a serial communications port 118. The disk interface 116 may be used to "boot" the HPCI device processor 110 upon power up. In the embodiment shown, the HPCI device processor 110 is a portion of a SUN 4/300 single board computer module which includes the ethernet interface 100, as well as the local memory 114, a SCSI disk interface 116 and the serial communications port 118. The HPCI device processor 110 communicates with the remaining modules of the HPCI device 20 by way of a multibit wide, high performance communication interface (HPCI) device bus 120. In the embodiment shown, the HPCI device processor 110 communicates with the other modules in the HPCI device 20 by way of a twenty four address line, thirty two data line, VME bus 120 with interrupt capability. The VME bus 120 is used in the embodiment shown because the SUN 4/300 computer module is used as the HPCI device processor 110, however, any compatible processor/bus combination may be used.

Data are transferred from the HPC bus 16 to the HPCI device 20 through a destination interface 130. The destination interface 130 is an intelligent device which communicates with and receives its instructions from the HPCI device processor 110 through the HPCI device bus 120 and which controls the flow of data from the HPC bus 16. Data received by the destination interface 130 from the HPC bus 16 is transferred to an I/O processor (IOP) 140 by way of a data transfer bus (DTB1) 132. In the embodiment shown, the data transfer bus (DTB1) is a 64 data bit, one parity byte wide bus capable of transferring data at 100 Mbytes/sec. Again, other buses may be used to perform this function.

The embodiment of the HPCI device 20 shown is capable of having up to eight I/O processors (IOPs) 140. However, it is contemplated that this number may be varied as desired. Each of the IOPs 140(a)-140(h) is in communication with the destination interface 130 by way of the data transfer bus (DTBl) 132. Each IOP 140 is also in communication with its associated supercomputer or data storage device by way of the computer communications buses 22. Each IOP 140 receives instructions from the HPCI device processor 110 through the HPCI device bus 120 and controls the flow of data from the destination interface 130 to the computer communication bus 22.

Each HPCI device 20 also includes a source interface 150 which is also in communication with each IOP 140. The source interface 150 is an intelligent device which communicates with and receives its instructions from the HPCI device processor 110 through the HPCI device bus 120. The source interface 150 controls the flow of data to the HPC bus 14. Data received by the source interface 150 from the IOP 140 by way of a data transfer bus (DTB2) 152 is transferred to HPC bus 14 by the source interface. As with DTB1, the DTB2 bus is a 64 data bit, one parity byte wide bus capable of transferring data at 100 Mbytes/sec.

In typical operation, the frontend processor 52 instructs the superprocessor 50 to prepare to transmit to or receive data over the computer communication bus 22 from another supercomputer 12 or data storage device 54. The frontend processor 52 then issues an instruction over the ethernet 60 to the HPCI device processor 110 to prepare the HPCI device 20 to transmit or receive data from the HPC buses 14,16 respectively. The HPCI device processor 110 instructs the IOP 140, attached to the computer communication bus 22 over which the data are to be transferred, to prepare to transfer data from or to the computer communication bus 22. The HPCI device processor 110 also instructs either the source interface 150 or the destination interface 130, depending upon whether data are being transferred from the computer communication bus 22 or to the computer communication bus 22, to prepare to transmit data to the HPC bus 14 or take data from the HPC bus 16, respectively. Once the devices are ready, data may be received from the HPC bus 16 and transferred to the computer communication bus 22 or received from the computer communication bus 22 and transferred to the HPC bus 14.

Figure 4:
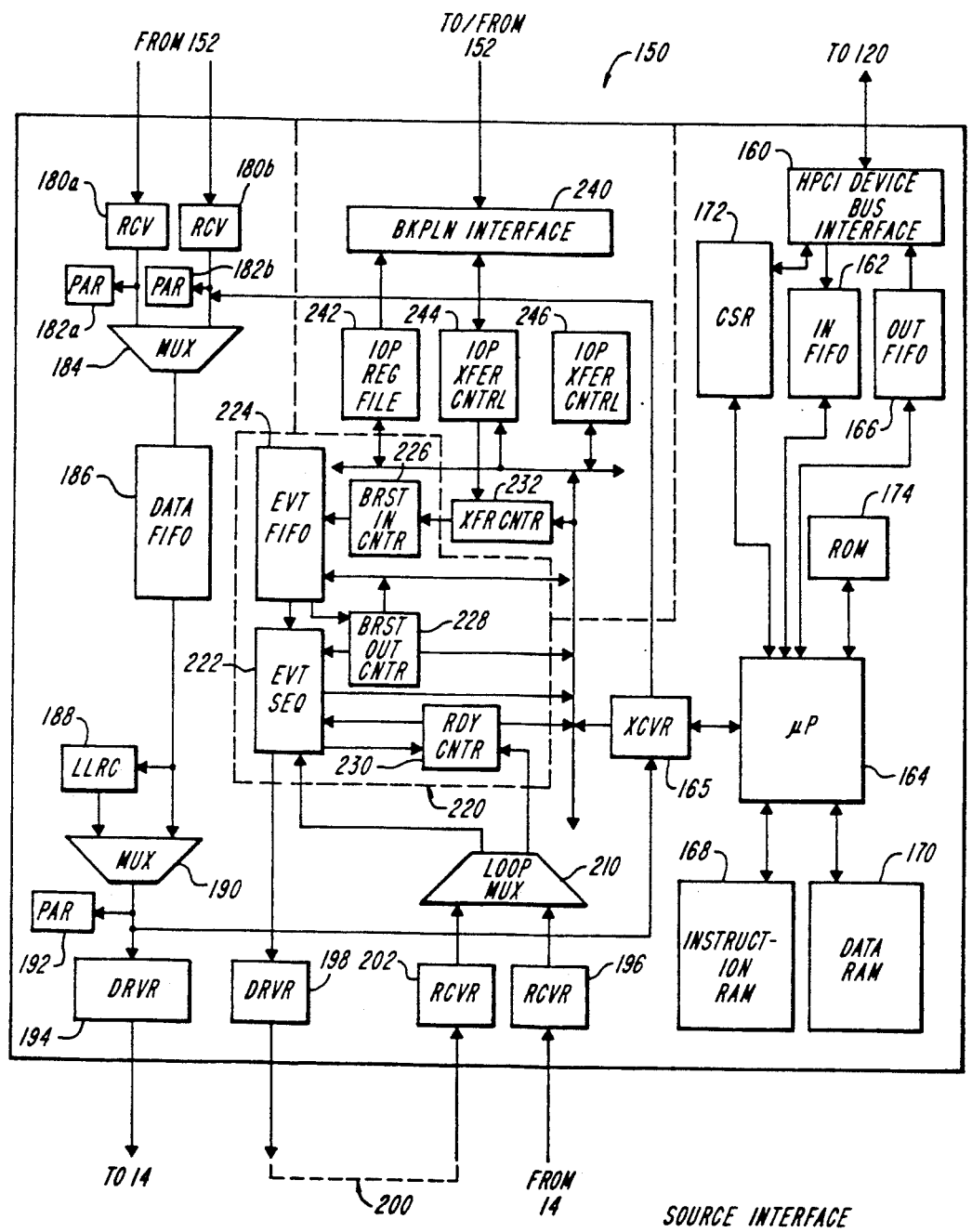
FIG. 4 is a block diagram of an embodiment of a source interface of the embodiment of the high performance communication interface device shown in FIG. 3.

Considering each of the interfaces of the HPCI device 20 in more detail, and referring to FIG. 4, the source interface 150 includes a HPCI device bus interface 160 through which the source interface 150 communicates with the HPCI device bus 120. The interface 150 is under the control of a local processor 164. In the embodiment disclosed, the processor 164 is an AMD 29000 RISC processor operating at 25 MHz, but, any other processor may be used. Data from the HPCI device bus 120 enter the HPCI device bus interface 160 and pass to a data IN FIFO 162 where it is accessible to the processor 164. Data from the processor 164 are passed to a data OUT FIFO 166 where it is accessible to the HPCI device bus interface 160 for placement on the HPCI device bus 120.

Instructions to be executed by the processor 164 are received over the HPCI device bus 120 from the HPCI device processor 110 and loaded into 512 KBytes of instruction RAM 168. This memory 168 is accessed by the processor 164 during the processor instruction fetch cycle. Data used by the processor 164 or generated by the processor 164 are stored in 512 Kbytes of data RAM 170. Control and status data from the HPCI device bus interface 160 are written into HPCI device bus control and status registers (CSRs) 172 for use both by the HPCI device bus interface 160 and the processor 164. A small set of instructions (similar to boot instructions) are stored in a portion of the 512 Kbytes of ROM 174 and provide the initialization instructions required for the processor 164 to load the program instructions from the HPCI device processor 110 over the HPCI device bus 120. The ROM 174 also holds a set of basic diagnostics by which the interface is tested. The processor 164 communicates with the other components of the source interface 150 by means of a bidirectional bus and transceiver 165.

The data to be transmitted over the HPC bus 14 enter the source interface 150 from the DTB2 bus 152. Two receivers 180(a) and 180(b) each read 32 bits of parallel data from the DTB2 bus 152. The parity of each group of data bits is checked by a parity checking circuit 182(a),182(b) associated with each receiver. Data read by the receivers 180(a),180(b) is combined in a multiplexer 184 and sequentially stored in a HPC bus OUT FIFO 186. As data are transferred to the HPC bus 14, data are read from the HPC bus OUT FIFO 186 and a lengthwise longitudinal redundancy check (LLRC) is performed on the data by a LLRC circuit 188.

The method for computing the LLRC, as defined in the ANSI X3T9 standard, requires that the summation of the parity terms of each word be added to the count of the total number of words to be transmitted. In the embodiment herein disclosed, since the words which are to be transmitted are first placed in an OUT FIFO 186, once the buffer has received the last word, the number of words to be transmitted is known. Therefore, the number of words in the buffer can be preloaded into the LLRC circuitry and the completed LLRC generated immediately once the parity of the last word in the buffer has been summed. This technique saves at least one clock cycle in the calculation.

The check digits generated by the LLRC circuit 188 are multiplexed with the data from the HPC data OUT FIFO 186 by a multiplexer 190 and a second parity check is performed on all the bits by a parity checking circuit 192. The data are then transmitted by an HPC bus driver 194 over the HPC bus 14.

An HPC bus receiver 196 is connected to certain of the control lines, such as INTERCONNECT, CONNECT and READY, of the HPC bus 14. These lines, as described previously with respect to CONNECT and READY, are used by the destination interface 130 of the HPCI device 20 receiving data to indicate, to the source interface 150 of the instant HPCI device 20, that: (1) the HPCI device 20, which is to receive data, is powered on (INTERCONNECT), (2) that, in response to a REQUEST by the source HPCI device, the receiving HPCI device 20 is available for data transfers (CONNECT), and (3) that the receiving HPCI device 20 is ready for another burst of data (READY). These control lines establish and maintain communication between the sending and receiving HPCI devices 20.

In addition to the HPC driver 194 which places data from the data OUT FIFO 186 onto the HPC bus 14, a second driver, a loopback driver 198, is also provided to supply the proper control signals when the HPCI device is operated in a loopback configuration. In the loopback configuration, test signals are supplied by the loopback driver 198 to a loopback receiver 202 by way of a loopback connector 200, which connects the loopback driver 198 to a loopback receiver 202. This configuration exists so that tests may be performed on one HPCI device without the involvement of a second HPCI device. Since the signals from the loopback receiver 202 are substantially the same as the control signals from the HPC bus receiver 196 during operation, a multiplexer 210 multiplexes the signals from the loopback receiver 202 and the signals from the bus receiver 196.

The output signal from the multiplexer 210 is an input signal to an event controller 220. An event is an occurrence which requires some response from the interface with which the event is associated. In the present discussion events are occurrences which involve the source interface interface 150. Events are queued as they occur in an event FIFO 224. In the embodiment herein disclosed, events, which may be queued in the event FIFO 224 as a result of commands received from the HPCI device processor 110, include: a command to establish a connection with the other HPCI device (make_connection), a command to terminate the connection with the other HCPI device (end_connection), a command to begin transmitting a packet (start_packet), a command to terminate the transmission of a packet (end_packet), and a command to transmit a burst of data (send_burst). The events may be queued in response to occurrences which take place within the source interface 150 itself. For example, the reception from the computer 12 of an amount of data equal to one burst also queued and event (send_burst) in the event FIFO 224.

Events are queued in the event FIFO 224 as a series of 18 bit words. In the embodiment herein described each word includes nine bits of control information, with each bit corresponding to a specific event, and nine bits of word counter. An event sequencer 222, in the event controller 220, executes a command which corresponds to the first event queued in the event FIFO 224, and dequeues that event. The next event in the event FIFO 224 becomes the first event in the queue and the event sequencer 222 executes a command corresponding to that event and then dequeues that event. This process continues until all the queued events have been dequeued. During the dequeuing of an event, other events may be queued.

Data entering the source interface from the DTB2 bus 152 cause the value in a burst_in counter 226 to increment. Once the burst_in counter 226 overflows, signaling the presence of another group of 256 words (one burst) in the data OUT FIFO 186, a send_burst bit is automatically set in the EVENT FIFO 224 indicating that a burst of data is to be transmitted from the data OUT FIFO 186. Each time a burst of data is transmitted from the source interface 150 over the HPC bus 14, the value in a burst_out counter 228 is incremented.

A ready counter 230 is incremented each time a ready signal is received from the other HPCI device 20 on the HPC bus 14, and is decremented each time burst of data is transmitted from the source interface 150 over the HPC bus 14. A transfer counter 232 maintains a total count of the number of bursts transmitted over the HPC bus 14.

The control of the movement of data, from the DTB2 bus 152 to the source interface 150, partially resides in the backplane interface 240 which communicates with the control lines of the DTB2 bus 152. Associated with the interface 240 are: a total transfer counter 232, which maintains a count of the total amount of data transferred from the DTB2 bus 152; an IOP transfer counter 246, which maintains a count of the amount of data transferred from the IOP 140 which is currently selected (i.e. transferring data to the source interface 150); an IOP file 242 which contains a sequential list of the IOPs 140 from which data is to be transferred, and an IOP transfer controller 244 which selects, from the IOP file 242, the next sequential IOP 140 from which data is to be transferred. When the next IOP 140 in the IOP file 242 is selected, the IOP transfer counter 246 is zeroed.

Figure 5:
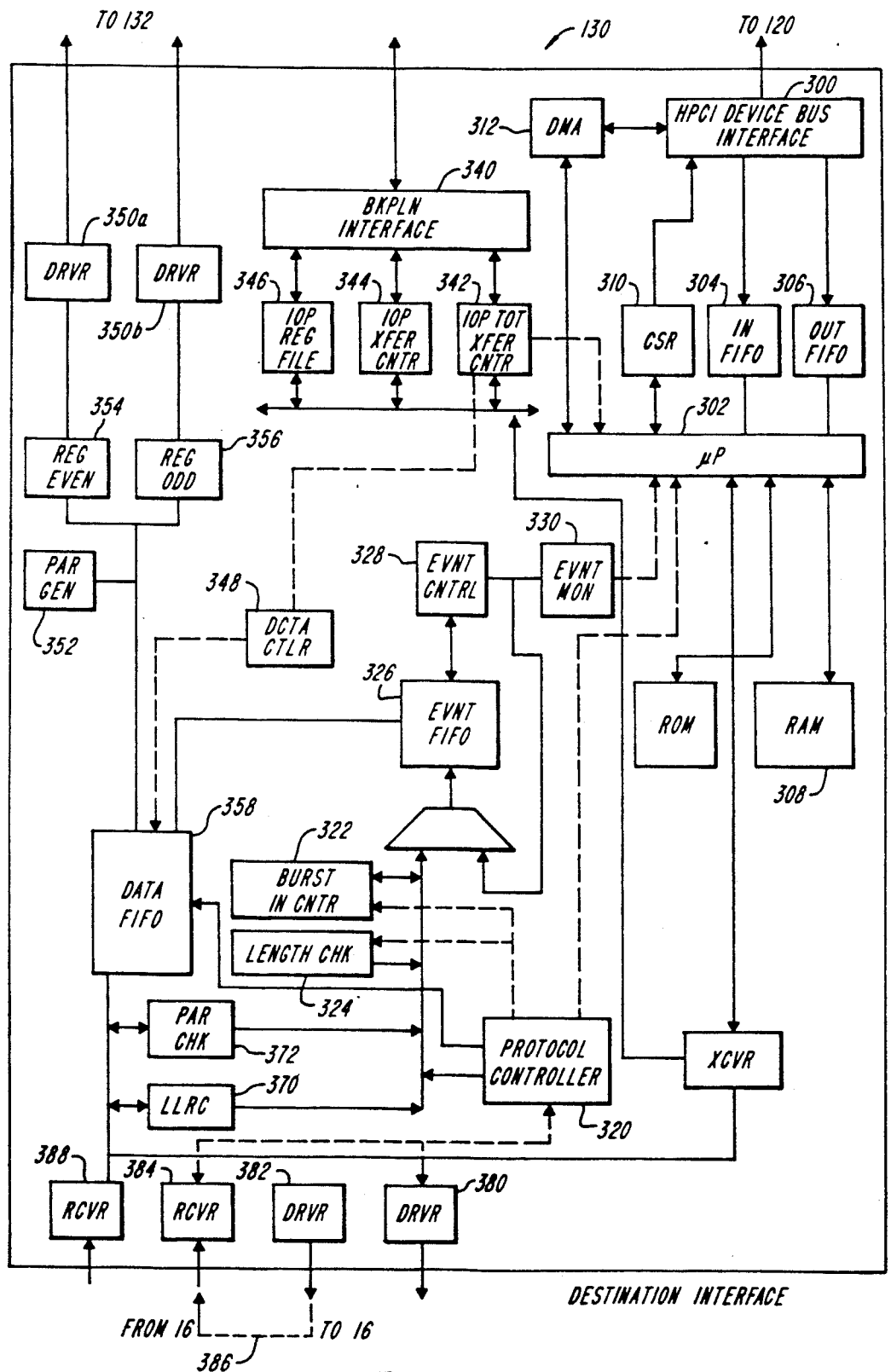
FIG. 5 is a block diagram of an embodiment of a destination interface of the embodiment of the high performance communication interface device shown in FIG. 3.

Referring to FIG. 5, the destination interface 130 is similar to the source interface 150 in that it includes a HPCI device bus interface 300 through which the destination interface 130 communicates with the HPCI device bus 120. In the embodiment shown, a processor 302, again an AMD 29000 RISC processor operating at 25 MHz, controls the operation of the interface 130. Although an AMD 29000 RISC processor is used in this embodiment, any other processor may be used. Data from the HPCI device bus 120 enter the HPCI device bus interface 300 and pass to a data IN FIFO 304 where it may be accessed by the processor 302. Data from the processor 302 are passed to a data OUT FIFO 306 where it may be accessed by the HPCI device bus interface 300 and placed on the HPCI device bus 120.

Instructions to be executed by the processor 302 are received over the HPCI device bus 120 and loaded into 512 KBytes of general purpose RAM 308 which is accessed by the processor 302 during the processor instruction fetch cycle. Data, for example parameters, used by the processor 302 or generated by the processor 302 are also stored in the 512 Kbytes of RAM 308. Control and status data from the HPCI device bus interface 300 are written to HPCI device bus control and status registers (CSRs) 310 for access both by the HPCI device bus interface 300 and the processor 302. A DMA interface 312 permits direct memory access over the HCPI device bus 120.

A small set of instructions (similar to boot instructions) are stored in 512 Kbytes of ROM 314 and provide sufficient instructions for the processor 302 to load program instructions from the HPCI device processor 110 over the HPCI device bus 120.

As data are received from the HPC bus 16 by a receiver 388 and placed into a data FIFO 358, a lengthwise longitudinal redundancy check (LLRC) is performed on the data by a LLRC circuit 370 while a parity check is performed on the data by a parity checking circuit 372. When the data in the data FIFO 358 is to be transmitted over the DTB1 bus 132, the data in the form of 16 bit words, are sequentially removed from the data FIFO 258 two at a time and placed into an even register 354 and an odd register 356 respectively to form a 32 bit word. The parity for each data word is generated by a parity generator circuit 352 associated with the data FIFO 358. The data pass from the destination interface 130 to the DTB1 bus 132 by way of two drivers 350(a) and 350(b). Each driver places 16 bits of parallel data on the DTB1 bus 152 to form one thirty-two bit word.

As the data enters the destination interface 130 from the HPC bus 16, a burst_in counter 322 increments a count of the number of bursts received. A length check circuit 324 determines that the amount of data received corresponds to the amount of data which were to be received. As data is received by the interface 130 an event is generated in an event FIFO 326.

Control signals, which are transmitted over the HPC bus 16 in response to the reception of data over the HPC bus 16, are the responsibility of a protocol controller 320. The protocol controller 320 controls an HPC bus driver 380 which is connected to certain of the control lines of the HPC bus 16 (in this embodiment, INTERCONNECT, CONNECT and READY). The functioning of these lines has been explained previously.

In addition to the HPC driver 380 which places control signals onto the HPC bus 16, a second driver, a loopback driver 382, is provided to supply the proper control signals when the HPCI device 20 is operated in the loopback configuration. As explained with regard to the source interface 150 in the loopback configuration, test signals, which are supplied by the loopback driver 382, are transmitted to a loopback receiver 384 by way of a loopback connector 386. The loopback connector 386 connects the loopback driver 382 to a loopback receiver 384, so that tests may be performed on the destination interface 130 of the HPCI device 20 without the involvement of a second computer on the HPC bus 16.

As in the source interface 150, control of the movement of data from the destination interface 130 to the DTB1 bus 132 partially resides in the backplane interface 340 which communicates with the control lines of the DTB1 bus 132. Associated with the backplane interface 340 are: an IOP transfer counter 342, which maintains a count of the amount of data transferred to the selected IOP; an IOP file 346, which contains a sequential list of the IOPs 140 to which data is to be transferred, and an IOP transfer controller 344, which selects, from the IOP file 346, the next sequential IOP 140 to which data is to be transferred. A data controller 348 controls the movement of data from the data FIFO 358 to the registers 354,356 in response to control signals from the interface 340.

Figure 6:
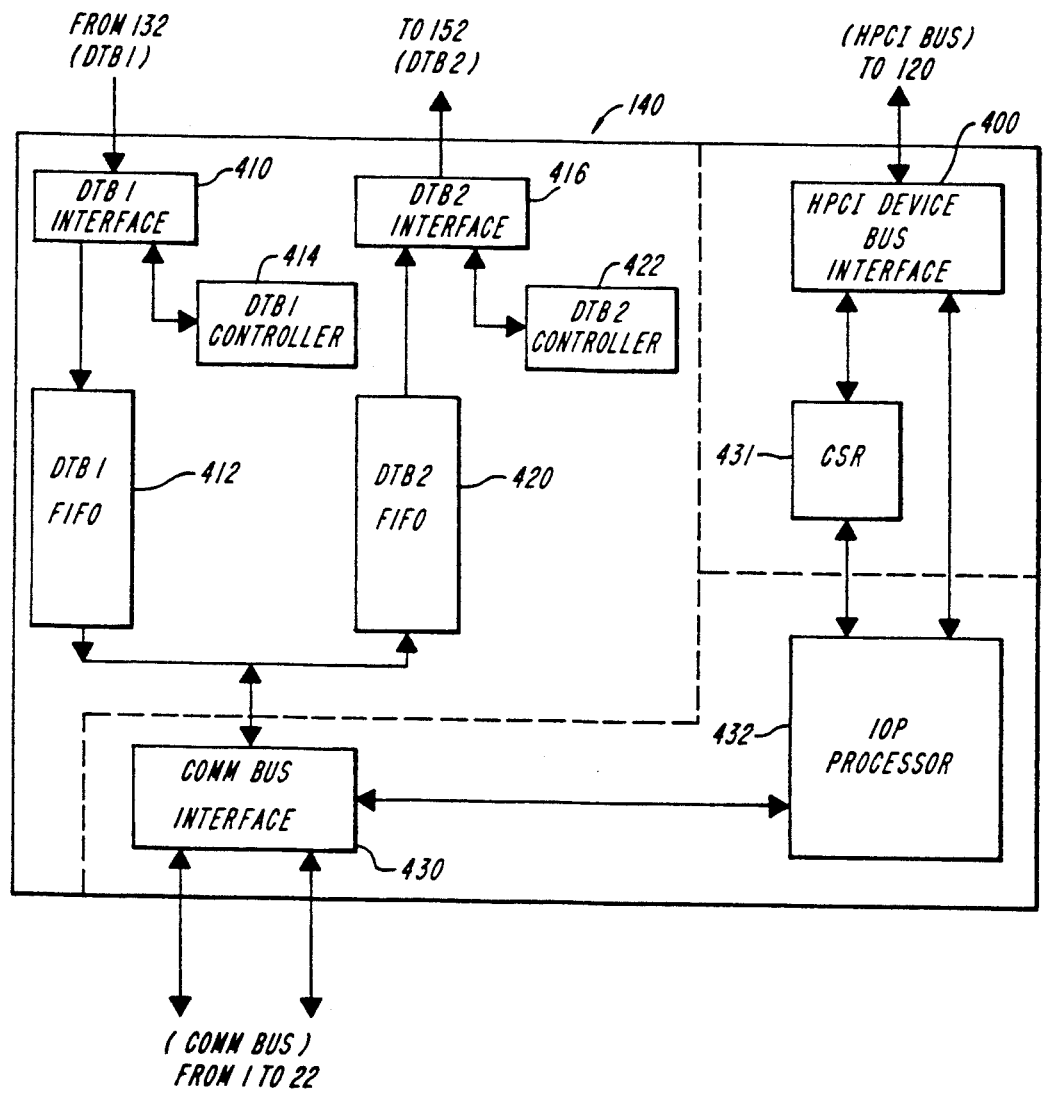
FIG. 6 is a block diagram of an embodiment of an I/O-processor interface of the embodiment of the high performance communication interface device shown in FIG. 3.

Referring to FIG. 6, each IOP 140 includes a HPCI device bus interface 400 by which the IOP 140 communicates with the HPCI bus 22. The HPCI processor 110 sends instructions to the IOP 140 over the HPCI device bus 120. These instructions are passed to an IOP processor 432 by the HPCI device bus interface 400. A control and status register (CSR) 431 provides status information to the IOP processor 432 and control information for the HPCI device bus interface 400. Instructions which are received from the HPCI processor 110 are executed by the IOP processor 432. The IOP processor 432 controls the flow of data from the DTB1 bus 132 to the communications bus 22 and the flow of data from the communications bus 22 to the DTB2 bus 152.

Data are received by the IOP 140 from the DTB1 bus 132 through the DTB1 interface 410. The incoming data are transferred into a DTB1 data FIFO 412 under the command of a DTBI controller 414. Data are sequentially removed from the data FIFO 412 and placed on the computer communication bus 22 by the computer communication bus interface 430.

Conversely, data enters the computer communication bus interface 430 from the computer communication bus 22 and are then transferred into the DTB2 data FIFO 420. Data in the DTB2 data FIFO 420 are first transferred to the DTB2 interface 416 under the control of the DTB2 controller 422. Data are then transmitted from the the DTB2 interface 416 onto the DTB2 bus 152. Once the data path has been established to/from the computer communication bus 22 from/to the DTB buses 132,152, the transfer of data proceeds without further IOP processor 432 intervention.

The DTB interfaces 410,416 are constructed to minimize the time required to deselected one IOP 140 and selected a subsequent an IOP 140 so as to minimize the "deadtime" or the time during which no data transfers are occurring. Part of this deadtime minimization results from the switching of data from one IOP 140 to the next IOP 140 in the IOP file 242,346 by enabling or disabling the IOP 140 during the time when data has been placed on the DTB bus 132,152 but is not yet stable. This is accomplished through the use of separate control and data clocks for the DTB buses 132,152. The control clock operates at twice the frequency (25 MHz) of the data clock (12.5 MHz). The effect of having two clocks can most easily be seen through the various timing situations involving data transfer over the DTB buses 132,152.

Figure 7:
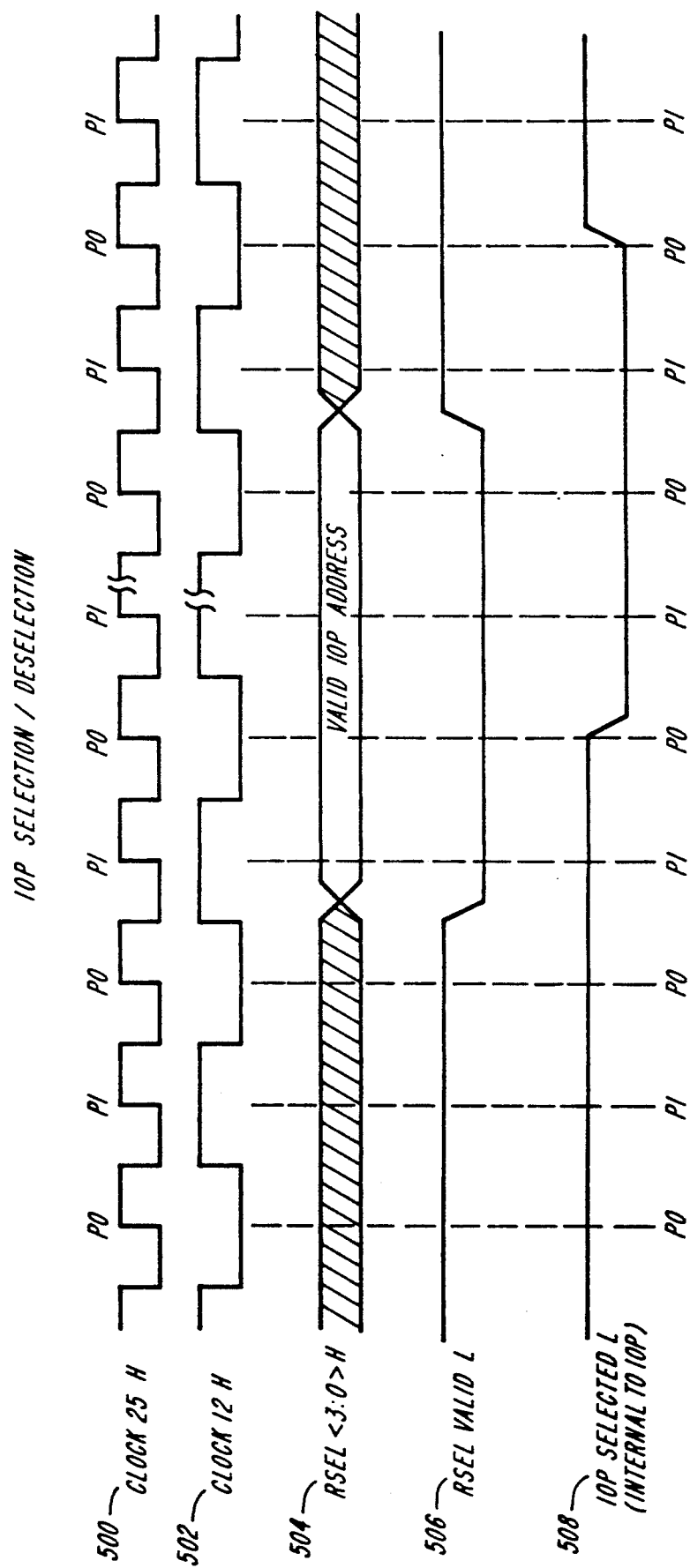
FIGS. 7-7g are the timing diagrams for the embodiment of the DTB bus shown in FIG. 3.
Figure 7A:
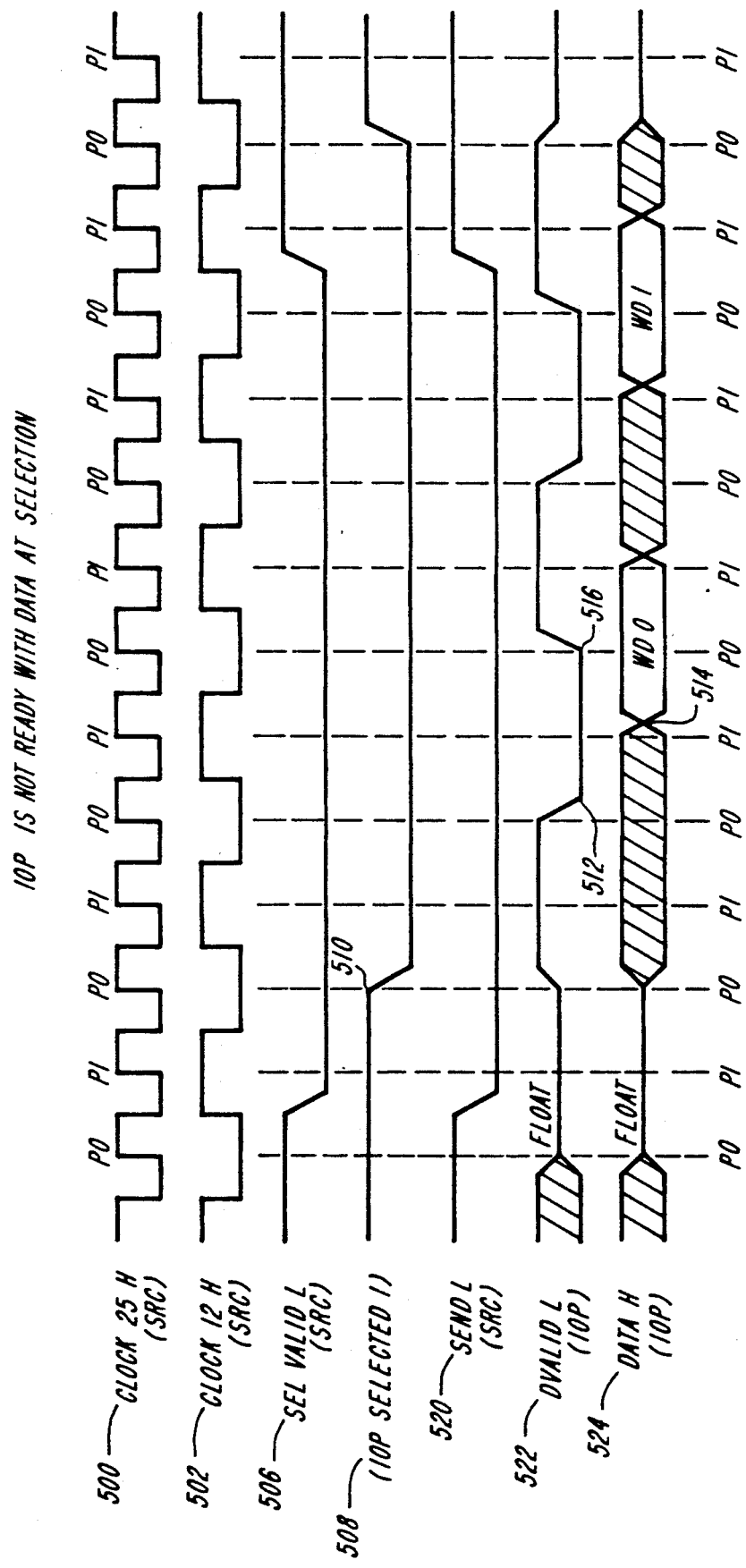
Figure 7B:
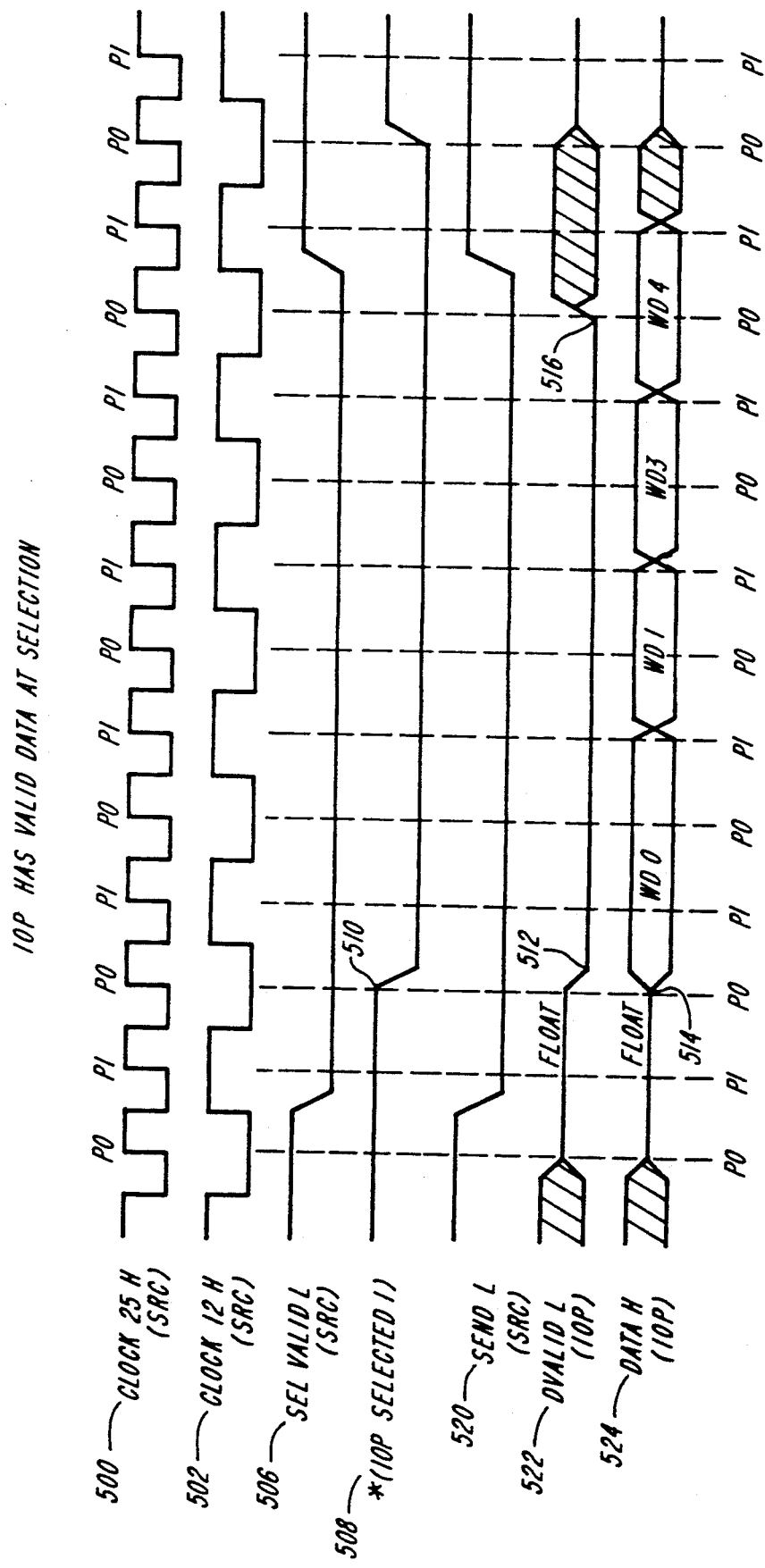
Figure 7C:
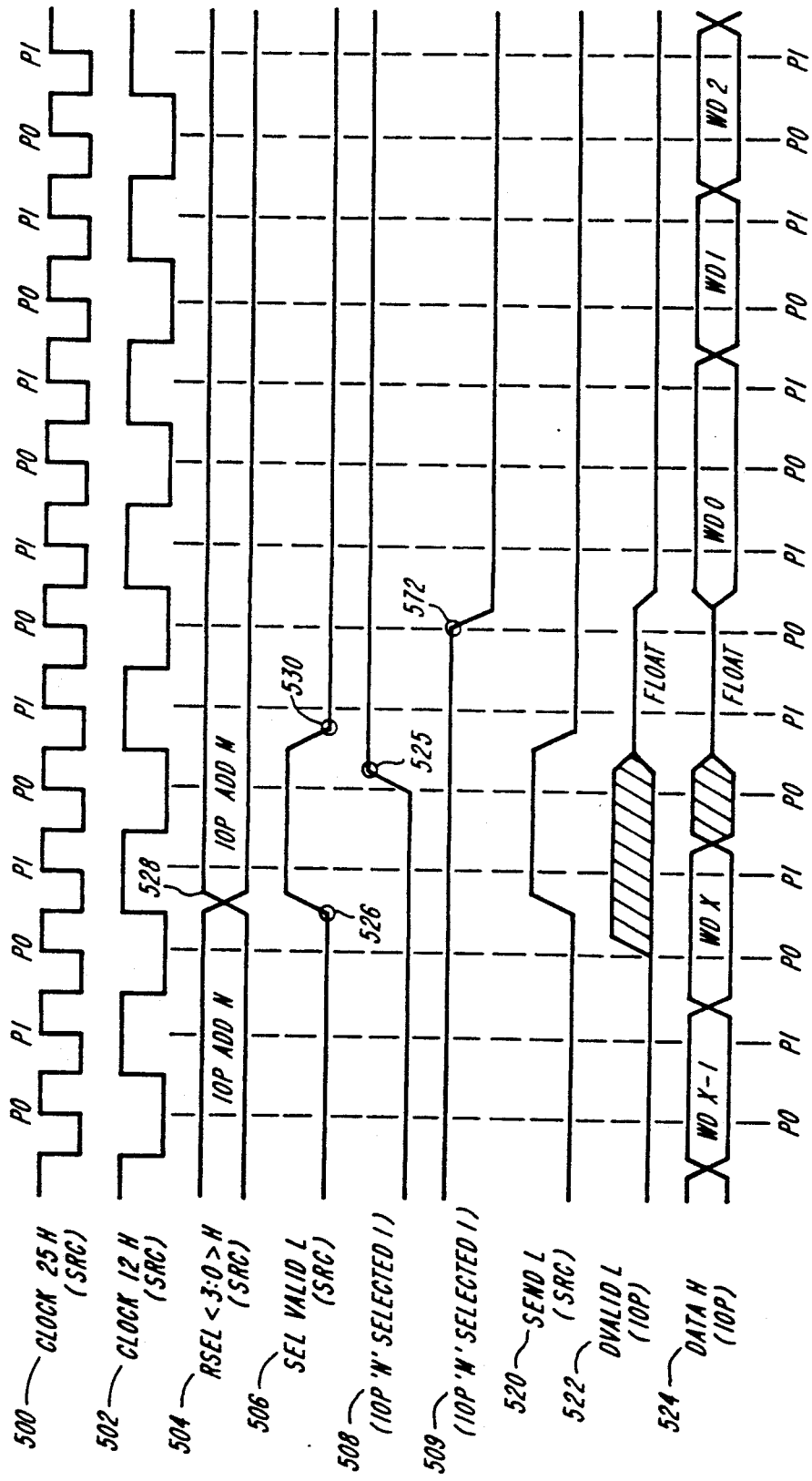
Figure 7D:
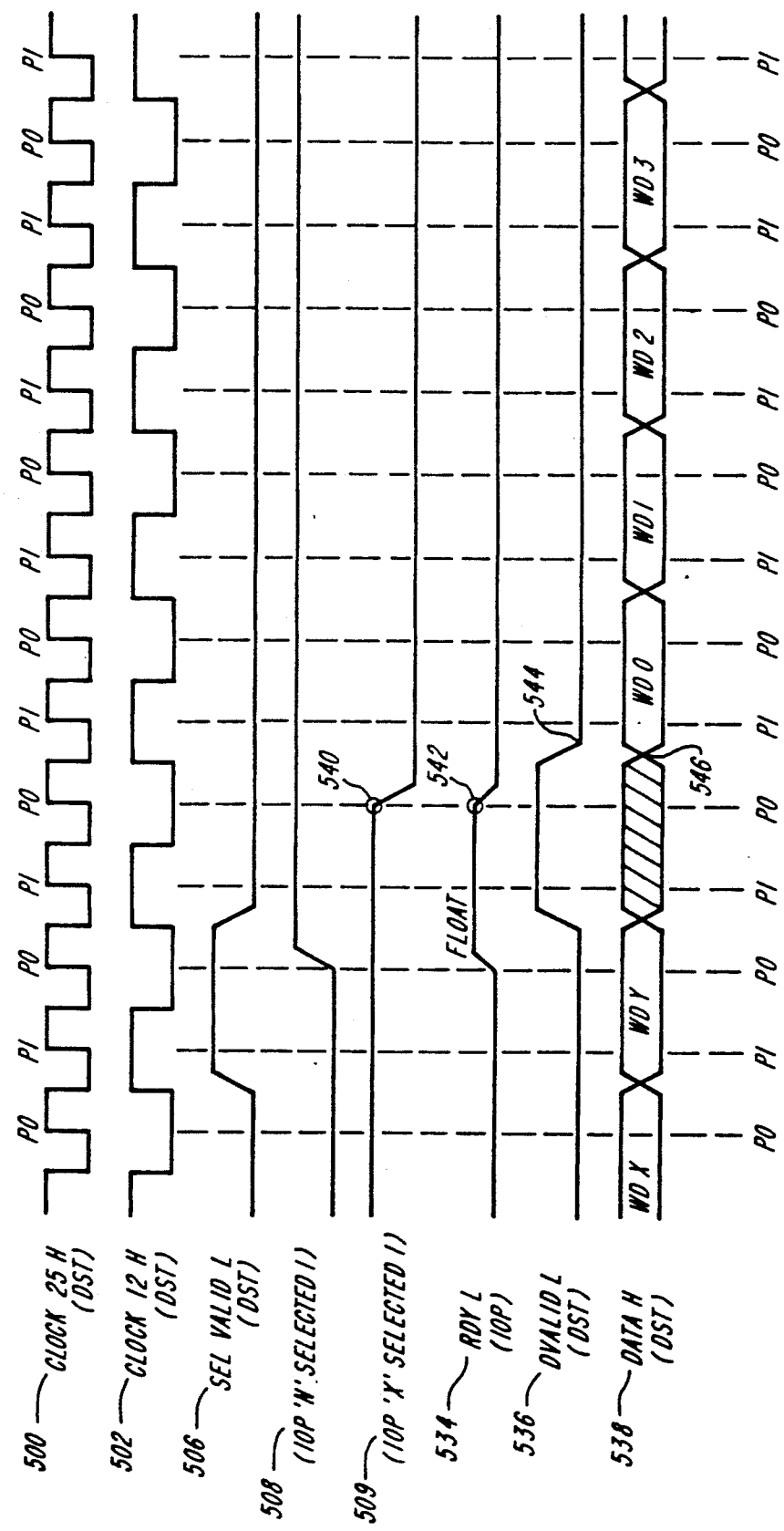
Figure 7E:
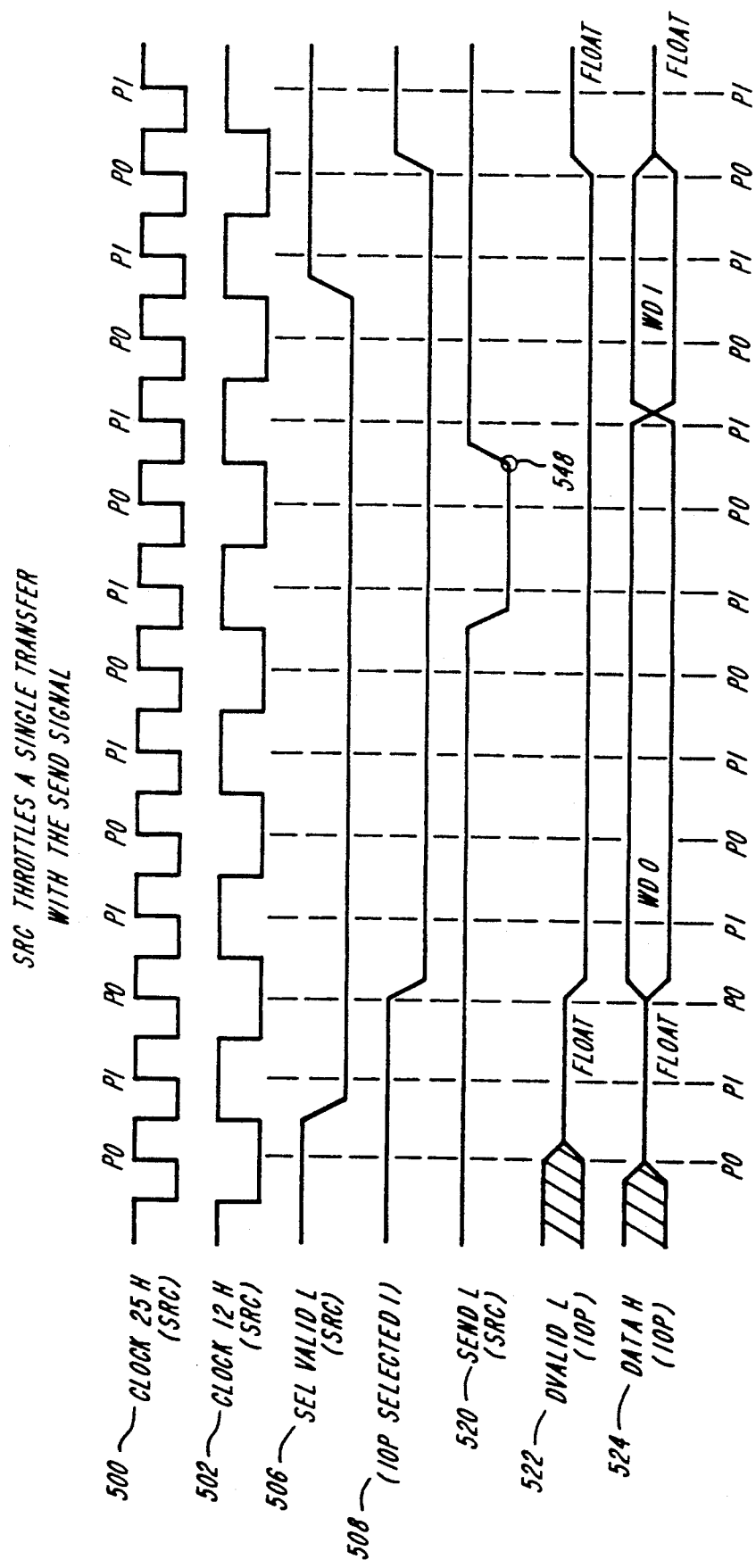
Figure 7F:
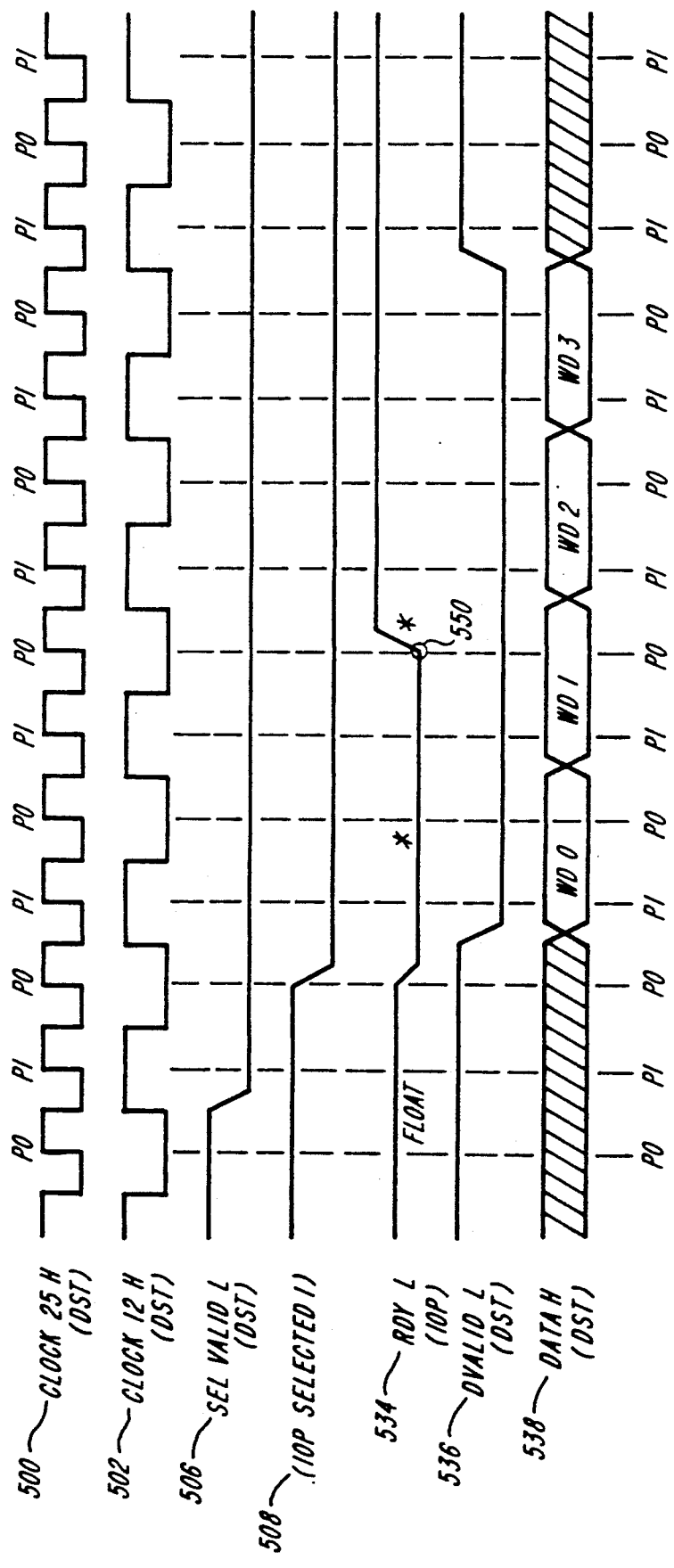
Figure 7G:
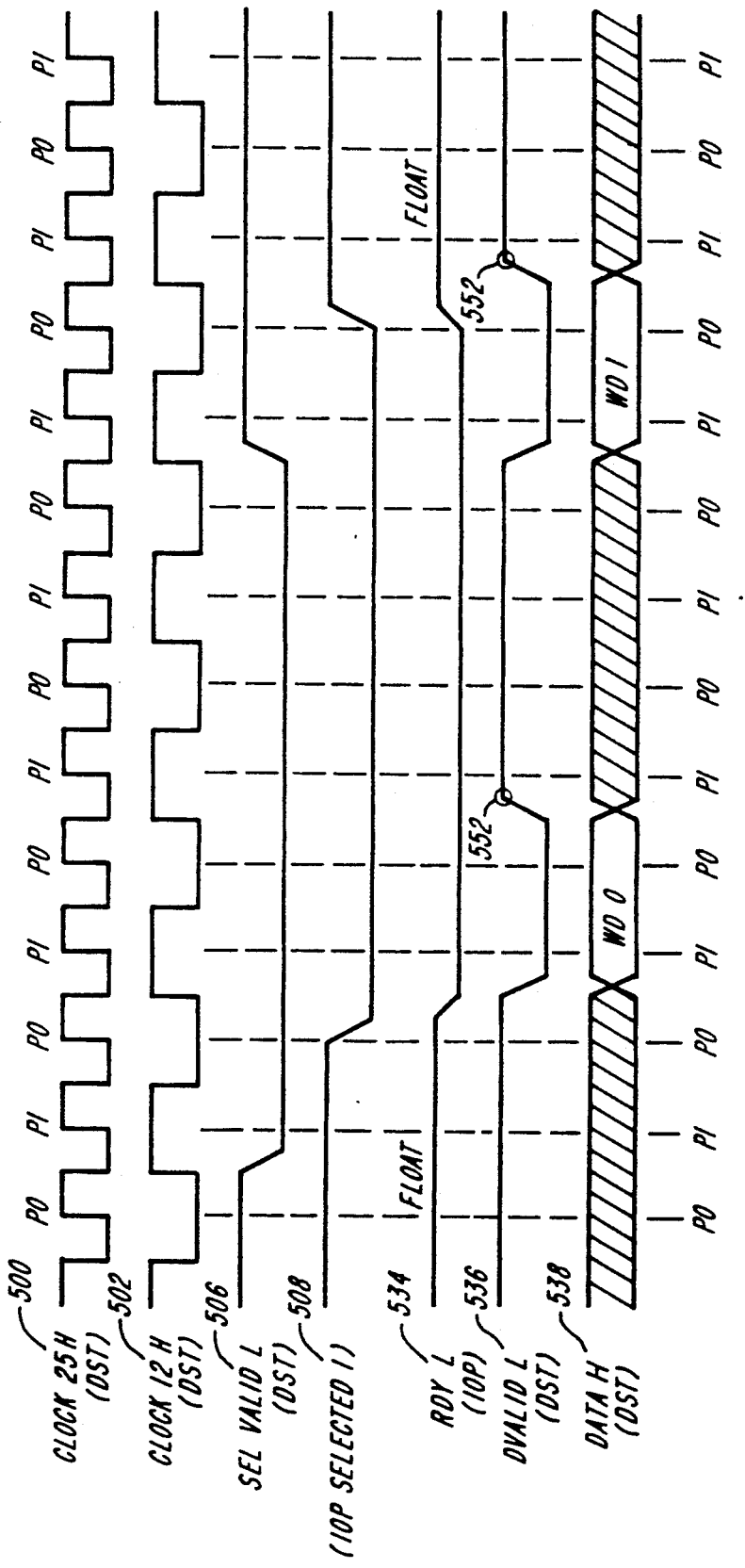

FIGS. 7-7g depict the timing diagrams for the various signals generated and utilized by the source interface 150, the destination interface 130 and the IO processor 140. For each signal in each figure, the designation in parentheses refers to the interface which generates the signal. That is, the source interface 150 is designated (SRC); the destination interface 130 is designated (DST) and the IO processor 140 is designated (IOP). Referring first to FIG. 7, a general timing diagram for the deselection of one IOP and selection of a second IOP 140 to communicate with the source interface 150 includes a control clock signal 500 which clocks control states into the IOP. An example is the clocking of the address 504 of the selected IOP 140 into the IOP 140. A data clock signal 502 clocks data to/from the DTB bus 132,152. Once valid address data 504 is stable on the address lines, the address valid line 506 is asserted and within one control clock cycle the selected IOP 140 becomes responsive 508.

In the context of transferring data from a superprocessor 12 to the HIPPI interface 20, FIG. 7a, depicts the timing signals if a selected IOP 140 is to transfer data 524 into the source interface 150, but either does not have data 524 immediately available or has data 524 intermittently available. After being selected 510 and following the assertion of the SEND signal 520 by the source interface 150, the IOP 140 asserts 512 the data valid signal 522 and data 524 is available 514 on the data lines within three control clock cycles 500 of the selection 510 of the IOP 140. As each word is transferred, the data valid line 522 is deasserted and then reasserted as the next word becomes available.

If data 524 is available upon selection 510 of the IOP 140 (FIG. 7b) the IOP 140 asserts 512 the data valid signal 522 and data 524 is immediately available 514 for transfer. The data valid line 522 stays asserted until all the data has been transferred, at which point the line 522 is deasserted.

Referring to FIG. 7c, to change the IOP 140 which is to transfer data 524 to the source interface 150, the valid address line 506 is first deasserted 526 and the address of the new IOP 140 which is to transfer data to the source interface 150 is placed o the address lines 504. The previous selected IOP 140 is deselected 525 within one clock cycle, of the 25 MHz. logic clock 500, of the deassertion 526 of the valid address signal 506. Once the address on the address lines 504 is stable 528, the valid address line 506 is asserted 530, causing the newly selected IOP 140 to be selected 532 and transmit data 524 to the source interface 150.

Similarly, (FIG. 7d) when an IOP 140, which is receiving data 524 from the HPC bus 16 by way of the destination interface 130, is to be deselected and another IOP 140 selected, the deassertion of the valid address line 506 causes the current IOP to be deselected 508. Once the address of the newly selected IOP 140 is stable, the valid address line 506 is again asserted and the new IOP 140 is selected 509. Once the new IOP 140 is selected 542, the IOP 140 asserts 542 the READY signal 534 and the destination interface 130 places 546 data 538 on the bus and asserts 544 the data valid line 536. The data is then transferred.

It should also be noted that flow control is accomplished by the use of several of the control signals: the SEND signal 520 may be deasserted 548 by the source interface 130 to permit or inhibit the transfer of data from the IOP 140 to the source interface 130 (FIG. 7e); the READY signal line 534 may be deasserted 550 by the IOP 140 to permit or inhibit the transfer of data from the destination interface 150 (FIG. 7f); and the data valid signal 506 may be deasserted 552 by the destination interface 130 to indicate to the IOP 140, that the destination interface 130 can not maintain full bandwidth (FIG. 7g).

OPERATION

Considering the transmission of data from the superprocessor 12 to the HPC bus 14 and referring again to FIG. 2. the front end processor 52 instructs the supercomputer 50 to make data available for transmission over a specified computer communication bus 22 to a specified entity on that bus. In this example the specified entity is an IOP 140.

The front end processor 52 then sends commands to the HPCI 20 over the Ethernet 60 by way of the Ethernet interface 100. These commands instruct the HPCI 20 to expect data to be sent from the supercomputer 50 over the computer communication bus 22. An IOP configuration table stored in RAM memory 114 in the HPCI 20 during initialization permits the processor 110 to determine which IOP 140 is connected to the specified computer communication bus 22. The processor 110 then loads, over the HPCI bus 120, the information concerning the source of the data on the computer communication bus 22 and how much data is to be transferred into the selected IOP 140.

The HPCI device bus interface 400 (FIG. 6) of the selected IOP 140 receives the source and amount data from the HPCI bus 120 and both, sets the CSR 431, and starts the IOP processor 432. The IOP processor 432 then initializes the rest of the IOP 140. The communication bus interface 430 is initialized to enable it to receive data from the computer communication bus 22. The IOP processor 432 then enables the DTB2 data path to allow the transfer of data from the computer communication bus interface 430 through the DTB2 FIFO 420 to the DTB2 interface 416 and it disables the DTB1 data path, thereby preventing data from being transferred from DTB1 132 by way of the DTB1 interface 410 through the DTB1 FIFO 412 to the computer communication bus interface 430. The IOP processor 432 initializes the DTB2 controller 422 to permit the data transfer to take place under the control of the DTB2 controller 422 without further intervention by the IOP processor 432.

While the IOP board 140 is being initialized, the HPCI processor 110 is also initializing the source interface 150, FIG. 4, to permit it to transfer data over the HPC bus 14. The HPCI device bus interface 160 on the source interface 150 receives instructions from the HPCI processor 110 to prepare to receive data over the DTB2 bus 152.

The source interface processor 164 executes these instructions and prepares to receive data from the designated IOP 140. For example, the source interface processor 164 sets the transfer counter 246 to expect to transfer a total of 100 MBytes at 1 MByte per IOP. The processor 164 then loads the IOP register file 242 with the IOP 140 from which data is to be transferred and enables the port driver 194. Once the components within the system have been initialized, the data path is enabled, thereby permitting the IOP transfer controller 244 to read the IOP register file 242 to determine from which IOP 140 to accept data. The enabling of the data path allows data flow to occur in response to the events queued in the event FIFO 224.

Data from the selected IOP 140 is written into the data FIFO 186 and the burst in counter 226 incremented. The ready counter 230 is examined and if a ready signal has been received from the receiving HPCI device 20, data is transmitted from the data FIFO 186 onto the HPC bus 14. The ready counter 230 is decremented, while the IOP transfer counter 246, the transfer counter 232 and the burst out counter 228 are incremented. The event is then dequeued from the event FIFO 224.

Once all the data has been transferred from the selected IOP 140, the next IOP 140 is selected by dequeuing it from the IOP register file 242. The IOP processor 164 writes an event in the event FIFO 224 to establish a connection with the next IOP 140 in the IOP register file 242. The process of transferring data is then repeated.

Next considering the transmission of data from the HPC bus 14 to the superprocessor 12 and referring again to FIG. 2, the front end processor 52 instructs the supercomputer 50 to prepare to receive data over a specified computer communication bus 22 from a specified entity on that bus. Again in this example the specified entity is an IOP 140.

The front end processor 52 sends commands to the HPCI 20 over the Ethernet 60 by way of the Ethernet interface 100. These commands instruct the HPCI 20 to expect data to be sent from the HPC bus 16 to the supercomputer 50 over the computer communication bus 22. An IOP configuration table stored in RAM memory 114 in the HPCI 20 during initialization permits the processor 110 to determine which IOP 140 is connected to the specified computer communication bus 22. The processor 110 then loads, over the HPCI bus 120, the information concerning the data being transferred from the HPC bus 16 and how much data is to be transferred into the selected IOP 140.

The HPCI device bus interface 400 (FIG. 6) of the selected IOP 140 receives information about the source and amount data over the HPCI bus 120 and both sets the CSR 431 and starts the IOP processor 432. The IOP processor 432 then initializes the rest of the IOP 140. The communication bus interface 430 is initialized to enable it to transmit data to the computer communication bus 22. The IOP processor 432 then enables the DTB1 data path to allow the transfer of data to the computer communication bus interface 430 through the DTB1 FIFO 412 from the DTB1 interface 410 and it disables the DTB2 data path, thereby preventing data from being transferred from DTB2 152 by way of the DTB2 interface 416 through the DTB2 FIFO 420 to the computer communication bus interface 430. The IOP processor 432 initializes the DTBI controller 414 to permit the data transfer to take place under the control of the DTB1 controller 414 without further intervention by the IOP processor 432.

While the IOP board 140 is being initialized, the HPCI processor 110 is also initializing the destination interface 130, FIG. 5, to permit it to transfer data from the HPC bus 14. The HPCI device bus interface 300 on the destination interface 130 receives instructions from the HPCI processor 110 to prepare to transmit data over the DTB1 bus 132.

The destination interface processor 302 executes these instructions and prepares to transmit data to the designated IOP 140. For example, the destination interface processor 302 sets the transfer counter 342 to expect to transfer a total of 100 MBytes at 1 MByte per IOP. The processor 302 then loads the IOP register file 346 with the IOP 140 to which data is to be transferred and enables the port receiver 388. Once the components within the system have been initialized, the data path is enabled, thereby permitting the IOP transfer controller 344 to read the IOP register file 346 to determine to which IOP 140 the data is to be transferred. The enabling of the data path allows data flow to occur in response to the data arrival events queued in the event FIFO 326 and in response to control signals received from the computer communications bus 22.

A control line driver 380 places control signals, such as READY, on the HPC bus 16 and data transfer is initiated. Data from the HPC bus 16 is written into the data FIFO 358 after the data is checked for correct parity 372, LLRC 370 and length 324. The burst in counter 322 is then incremented. The reception of data causes an event to be queued in the event FIFO 326 indicating that data is available for transfer to the IOP 140. The event monitor 330 and event controller 328 in conjunction with the data controller 348 permit a sequential array of byte data in the data FIFO 358 to be transferred from the data FIFO 358 by way of the even register 354 and odd register 356 of the interface. The even register 354 and odd register 356 then form words by placing their byte data in parallel on the DTB1 bus 132 following parity generation 352. The data lines of the bus 22 are driven by drivers 350(a) and 350(b). Upon the transfer of data from the FIFO 358, the event, in this case, an arrival of data event, is then dequeued from the event FIFO 224.

Once all the data has been transferred to the selected IOP 140 across bus DTB1 132, the next IOP 140 is selected by dequeuing the IOP from the IOP register file 346. The IOP processor 302 then writes an event in the event FIFO 326 to establish a connection with the next IOP 140. The process of transferring data is then repeated.

It is understood that other modifications or embodiments are possible which will still be within the scope of the appended claims. These and other examples of the concept of the invention illustrated above are intended by way of example and the actual scope of the invention is to be determined solely from the following claims.

We claim:

1. A high performance communication interface for transferring data between at least one external device and a high performance communication bus, said high performance communication interface comprising:

a first data transfer bus;

a second data transfer bus;

at least one IO processor interface in electrical communication with said at least one external device and in electrical communication with said first data transfer bus and said second data transfer bus;

a destination communication interface in electrical communication with said high performance communication bus and comprising a destination data fifo and a destination event controller, said destination communication interface capable of receiving data into said destination data fifo from said high performance communication bus and transmitting data from said destination data fifo over said first data transfer bus to said at least one IO processor interface in response to events queued in said destination event controller; and a source communication interface in electrical communication with said high performance communication bus and comprising a source data fifo and a source event controller, said source communication interface capable of receiving data into said source data fifo from said at least one IO processor interface over said second data transfer bus and transmitting data from said source data fifo to said high performance communication bus in response to events queued in said source event controller, wherein said events are queued in said destination event controller in response to occurrences in said destination communication interface and said events are queued in said source event controller in response to occurrences in said source communication interface.

2. The high performance communication interface of claim 1 further comprising a high performance communication interface controller in electrical communication with said at least one IO processor interface, said high performance communication interface controller controlling the flow of data between said first data transfer bus and said at least one IO processor interface and controlling the flow of data between said second data transfer bus and said at least one IO processor interface in response to commands from said external device.

3. The high performance communication interface of claim 2 wherein said high performance communication interface controller is in electrical communication with said source communication interface and said destination communication interface, said high performance communication interface controller queuing events in said event controller of said source communication interface and queuing events in said event controller of said destination communication interface to thereby control the flow of data between said source communication interface and said high performance communication bus and to thereby control the flow of data between said high performance communication bus and said destination communication interface, respectively, in response to commands from said external device.

4. The high performance communication interface of claim 1 further comprising a first clock signal having a first clock frequency and a second clock signal having a second clock frequency, said second clock frequency being greater than said first clock frequency, said flow of data between first data transfer bus and said at least one IO processor interface and said flow of data between said second data transfer bus and said at least one IO processor interface being clocked by said first clock signal and said execution of commands by said at least one IO processor interface being clocked by said second clock signal.

5. The high performance communication interface of claim 4 wherein said second clock frequency is an integer multiple of said first clock frequency.

6. The high performance communication interface of claim 1 wherein said at least one IO processor interface comprises:
- an IO data input fifo in electrical communication between said at least one external device and said second data transfer bus; and
- an IO data input controller,
- said IO data input fifo receiving from said at least one external device and transmitting data to said second data transfer bus in response to commands from said IO data input controller.

7. The high performance communication interface of claim 6 wherein said at least one IO processor interface further comprises a second data transfer bus interface in electrical communication between said second data transfer bus and said IO data input fifo, and in electrical communication with said IO data input controller, said second data transfer bus interface permitting the flow of data between said second data transfer bus and said IO data input fifo in response to commands from said IO data input controller.

8. The high performance communication interface of claim 6 wherein said at least one IO processor interface further comprises an external bus communication interface in electrical communication between said at least one external device and said IO data input fifo, said external bus communication interface receiving data from said IO data input fifo and transmitting data to said at least one external device.

9. The high performance communication interface of claim 1 wherein said at least one IO processor interface comprises:
- an IO data output fifo in electrical communication between said at least one external device and said first data transfer bus; and
- an IO data output controller,
- said IO data output fifo receiving data from said first data transfer bus and transmitting data to said at least one external device in response to commands from said IO data output controller.

10. The high performance communication interface of claim 9 wherein said at least one IO processor interface further comprises a first data transfer bus interface in electrical communication between said first data transfer bus and said IO data output fifo, and in electrical communication with said IO data output controller, said first data transfer bus interface permitting the flow of data between said first data transfer bus and said IO data output fifo in response to commands from said IO data output controller.

11. The high performance communication interface of claim 10 wherein said at least one IO processor interface further comprises an external bus communication interface in electrical communication between said at least one external device and said IO data output fifo, said external bus communication interface receiving data from said at least one external device and transmitting data to said IO data output fifo.

12. An IO processor interface for use in a high performance communication interface having a first data transfer bus, a second data transfer bus and a high performance communication interface controller, said IO processor interface comprising:
- an IO data output controller in electrical communication with said high performance communication interface controller;
- a first data bus interface in electrical communication with sad first data transfer bus and in electrical communication with said IO data output controller;
- an IO data output fifo in electrical communication said first data bus interface;
- an IO data input controller in electrical communication with said high performance communication interface controller;
- a second data bus interface in electrical communication with a second data transfer bus and in electrical communication with said IO data input controller; and
- an IO data input fifo in electrical communication said second data bus interface,
- said first data bus interface transmitting data to said IO data output fifo from said first data bus in response to commands from said IO data output controller, said commands received by said IO data output controller from said high performance communication interface controller,
- said second data bus interface transmitting data from said IO data output fifo to said second data bus in response to commands from said IO data input controller, said commands received by said IO data input controller from said high performance communication interface controller.

13. A communication interface for use in a high performance communication interface, said communication interface in electrical communication with said high performance communication bus and a data transfer bus, said communication interface comprising:
- a data fifo; and
- an event controller,
- said communication interface capable of transferring data between said data fifo and at least one IO processor interface over said data transfer bus, and capable of transmitting data between said data fifo and said high performance communication bus in response to events queued in said event controller,
- said events being queued in said event controller in response to occurrences in said communication interface.

14. A high performance communication interface controller for use in a high performance communication interface,
- said high performance communication interface controller in electrical communication with a source communication interface in electrical communication with a high performance communication bus, said source communication interface comprising a source communication interface event controller, and
- said high performance communication interface controller in electrical communication with a destination communication interface in electrical communication with said high performance communication bus, said destination communication interface comprising a destination communication interface event controller,
- said high performance communication interface controller entering events in said source communication interface event controller and entering events in said destination communication interface event controller to thereby control the flow of data between said source communication interface and said high performance communication bus and to thereby control the flow of data between said high performance communication bus and said destination communication interface, respectively, in response to commands from an external device.

15. A high performance communication interface for transferring data between at least one external device and a high performance communication bus, said high performance communication interface comprising:
   a first data transfer bus;
   a second data transfer bus;
   at least one IO processor interface in electrical communication with said at least one external device and in electrical communication with said first data transfer bus and said second data transfer bus; and
   a communication interface in electrical communication with said high performance communication bus and comprising:
      a destination data fifo and a destination event controller, said communication interface capable of receiving data into said destination data fifo from said high performance communication bus and transmitting data from said destination data fifo over said first data transfer bus to said at least one IO processor interface in response to events queued in said destination event controller; and
      a source data fifo and a source event controller, said communication interface capable of receiving data into said source data fifo from said at least one IO processor interface over said second data transfer bus and transmitting data from said source data fifo to said high performance communication bus in response to events queued in said source event controller,
   wherein said events are queued in said destination event controller and in said source event controller in response to occurrences in said communication interface.

16. A processor device comprising:
   a bus;
   a processor in communication with said bus, said processor executing instructions for performing operations on data transferred over said bus;
   a first clock signal having a first clock frequency; and
   a second clock signal having a second clock frequency less than said first clock frequency,
   said execution of instructions by said processor being clocked by said first clock signal, and said transfer of data over said bus being clocked by said second clock signal.

17. The processor device of claim 16 wherein said first clock frequency is an integer multiple of said second clock frequency.

* * * * *